(12) United States Patent
Kondo et al.

(10) Patent No.: US 11,867,133 B2
(45) Date of Patent: Jan. 9, 2024

(54) HYDRAULIC STATIC TRANSMISSION SYSTEM

(71) Applicant: KAWASAKI JUKOGYO KABUSHIKI KAISHA, Kobe (JP)

(72) Inventors: Akihiro Kondo, Kobe (JP); Ryosuke Kusumoto, Kobe (JP); Yuki Nakayama, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 0 days.

(21) Appl. No.: 17/785,276

(22) PCT Filed: Nov. 26, 2020

(86) PCT No.: PCT/JP2020/043946
§ 371 (c)(1),
(2) Date: Jun. 14, 2022

(87) PCT Pub. No.: WO2021/124825
PCT Pub. Date: Jun. 24, 2021

(65) Prior Publication Data
US 2023/0022177 A1    Jan. 26, 2023

(30) Foreign Application Priority Data
Dec. 20, 2019   (JP) .................................. 2019-230263

(51) Int. Cl.
*F02D 41/00*     (2006.01)
*F02D 41/12*     (2006.01)
*F16H 61/421*    (2010.01)

(52) U.S. Cl.
CPC ......... *F02D 41/123* (2013.01); *F16H 61/421* (2013.01); *F02D 2200/501* (2013.01)

(58) Field of Classification Search
CPC .................. F02D 41/123; F02D 41/021; F02D 2200/501; F02D 2200/101; F02D 29/02;
(Continued)

(56) References Cited

U.S. PATENT DOCUMENTS 3,665,787 A * 5/1972 Wilkinson .............. F02B 33/34
                                                        123/561
4,365,473 A * 12/1982 Schexnayder ........ F16H 61/478
                                                         60/449
(Continued)

FOREIGN PATENT DOCUMENTS

JP        S62-18335 A     1/1987
JP        H07-54983 A     2/1995
(Continued)

*Primary Examiner* — Sizo B Vilakazi
*Assistant Examiner* — Sherman D Manley
(74) *Attorney, Agent, or Firm* — Oliff PLC

(57) ABSTRACT

A HST system for use in traveling of a vehicle includes a controller that controls a pump regulator that changes a displacement of a pump and a motor regulator that changes a displacement of a motor. The controller determines whether or not a particular downhill travel condition is satisfied based on a result of detection by a vehicle speed detector that detects a vehicle speed of the vehicle and a result of detection by a rotation number detector that detects a number of rotations of an engine per unit time. In a case where a depression amount of an accelerator pedal, which is detected by a depression amount detector, is zero and the particular downhill travel condition is satisfied, the controller controls the motor regulator to increase the displacement of the motor.

3 Claims, 4 Drawing Sheets

(58) Field of Classification Search
CPC .... F02D 29/04; F02D 2250/24; F16H 61/421; F16H 61/431; F16H 61/21; F16H 59/44; F16H 59/18; F16H 2059/186; F16H 2059/366
See application file for complete search history.

(56) References Cited

U.S. PATENT DOCUMENTS

| | | | | |
|---|---|---|---|---|
| 4,368,653 | A * | 1/1983 | Mizuno | F16H 47/04 477/69 |
| 5,517,410 | A | 5/1996 | Nakagawa et al. | |
| 6,170,587 | B1 * | 1/2001 | Bullock | B60K 6/365 903/910 |
| 6,358,174 | B1 * | 3/2002 | Folsom | F16H 47/04 475/83 |
| 7,613,560 | B2 * | 11/2009 | Nishi | F16H 61/462 701/50 |
| 2009/0238696 | A1 * | 9/2009 | Satake | F16H 61/421 417/34 |
| 2010/0083652 | A1 | 4/2010 | Fukuda et al. | |
| 2011/0202243 | A1 | 8/2011 | Ishibashi et al. | |
| 2014/0012472 | A1 | 1/2014 | Kamada | |
| 2014/0075930 | A1 * | 3/2014 | Maiyur | F16H 61/462 60/431 |
| 2014/0214295 | A1 * | 7/2014 | Elliott | E02F 9/2253 701/65 |
| 2016/0251827 | A1 * | 9/2016 | Ge | E02F 9/265 701/50 |
| 2018/0298837 | A1 | 10/2018 | Yamashita | |
| 2019/0226579 | A1 * | 7/2019 | Zhang | B60W 30/18136 |
| 2021/0002865 | A1 * | 1/2021 | Hyodo | F02D 31/001 |
| 2022/0154738 | A1 * | 5/2022 | Nakashima | F15B 21/005 |

FOREIGN PATENT DOCUMENTS

| | | |
|---|---|---|
| JP | 2000-074213 A | 3/2000 |
| JP | 2001-235032 A | 8/2001 |
| JP | 2004-28229 A | 1/2004 |
| JP | 2006-312924 A | 11/2006 |
| JP | 2007-183004 A | 7/2007 |
| JP | 2014-13054 A | 1/2014 |
| JP | 2018-178919 A | 11/2018 |
| WO | 2008/123376 A1 | 10/2008 |
| WO | 2010/070962 A1 | 6/2010 |

* cited by examiner

NUMBER OF ENGINE ROTATIONS Ne

PUMP DISPLACEMENT $q_P$

MOTOR DISPLACEMENT $q_M$

VEHICLE SPEED V

HYDRAULIC STATIC TRANSMISSION SYSTEM

CROSS-REFERENCE TO RELATED APPLICATIONS

This application is national stage application of International Application No. PCT/JP2020/043946 filed Nov. 26, 2020, which designates the United States, and claims priority to Japanese Patent Application No. 2019-230263, filed Dec. 20, 2019, the entire contents of which are incorporated herein by reference.

TECHNICAL FIELD

The present invention relates to a hydraulic static transmission system for use in traveling of a vehicle.

BACKGROUND ART

Conventionally, a hydraulic static transmission system (hereinafter, "HST system") for use in traveling of a vehicle has been known. In the HST system, a variable displacement motor that drives traveling means such as wheels or crawlers, and a variable displacement pump that is driven by an engine, are connected such that a closed loop is formed.

For example, as shown in FIG. 4, Patent Literature 1 discloses controlling the displacement $q_M$ of a motor and the displacement $q_p$ of a pump in accordance with a vehicle speed. Specifically, in a low speed region in which the vehicle speed is in the range of zero to V1, the displacement $q_p$ of the pump is increased from zero to the maximum value while the displacement $q_M$ of the motor is kept to the maximum value. In a medium speed region in which the vehicle speed is in the range of V1 to V2 and a high speed region in which the vehicle speed is higher than V2, the displacement $q_p$ of the pump is kept to the maximum value. The displacement $q_M$ of the motor decreases from the maximum value to the minimum value in the medium speed region, and is kept to the minimum value in the high speed region. According to this control, the higher the vehicle speed, the lower the speed reduction ratio.

Patent Literature 2 discloses that while neither an accelerator pedal nor a brake pedal is being depressed, an idling fuel is supplied to an engine. When the brake pedal is depressed, the fuel supply to the engine is stopped and the speed reduction ratio is increased, and thereby an engine brake is applied.

CITATION LIST

Patent Literature

PTL 1: WO 2010/070962 A1
PTL 2: Japanese Laid-Open Patent Application Publication No. S62-18335

SUMMARY OF INVENTION

Technical Problem

However, in the technique disclosed by Patent Literature 2, the engine brake is not applied unless the brake pedal is depressed.

In view of the above, an object of the present invention is to provide a HST system that makes it possible to use an engine brake regardless of whether or not a brake pedal is depressed.

Solution to Problem

In order to solve the above-described problems, the inventors of the present invention have paid attention to the fact that it is often the case that the engine brake needs to be applied when a vehicle travels downhill (i.e., when the vehicle travels on a downward slope), and then have come up with the idea of automatically determining whether or not a particular downhill travel condition is satisfied. The particular downhill travel condition is a condition under which the engine brake should be used. The present invention has been made from such a technological point of view.

Specifically, a HST system according to the present invention is a HST system for use in traveling of a vehicle. The HST system includes: a variable displacement motor that drives traveling means; a motor regulator that changes a displacement of the motor; a variable displacement pump connected to the motor such that a closed loop is formed, the variable displacement pump being driven by an engine; a pump regulator that changes a displacement of the pump; a depression amount detector that detects a depression amount of an accelerator pedal; a vehicle speed detector that detects a vehicle speed of the vehicle; a rotation number detector that detects a number of rotations of the engine per unit time; and a controller that controls the motor regulator and the pump regulator. The controller: determines whether or not a particular downhill travel condition is satisfied based on a result of detection by the vehicle speed detector and a result of detection by the rotation number detector; and in a case where the depression amount of the accelerator pedal, which is detected by the depression amount detector, is zero and the particular downhill travel condition is satisfied, controls the motor regulator to increase the displacement of the motor.

According to the above configuration, in a case where the depression amount of the accelerator pedal is zero and the particular downhill travel condition is satisfied, the displacement of the motor is increased, and thereby the speed reduction ratio is increased. This makes it possible to automatically use the engine brake regardless of whether or not the brake pedal is depressed.

Advantageous Effects of Invention

The present invention makes it possible to use an engine brake regardless of whether or not a brake pedal is depressed.

DESCRIPTION OF EMBODIMENTS

Figure 1:
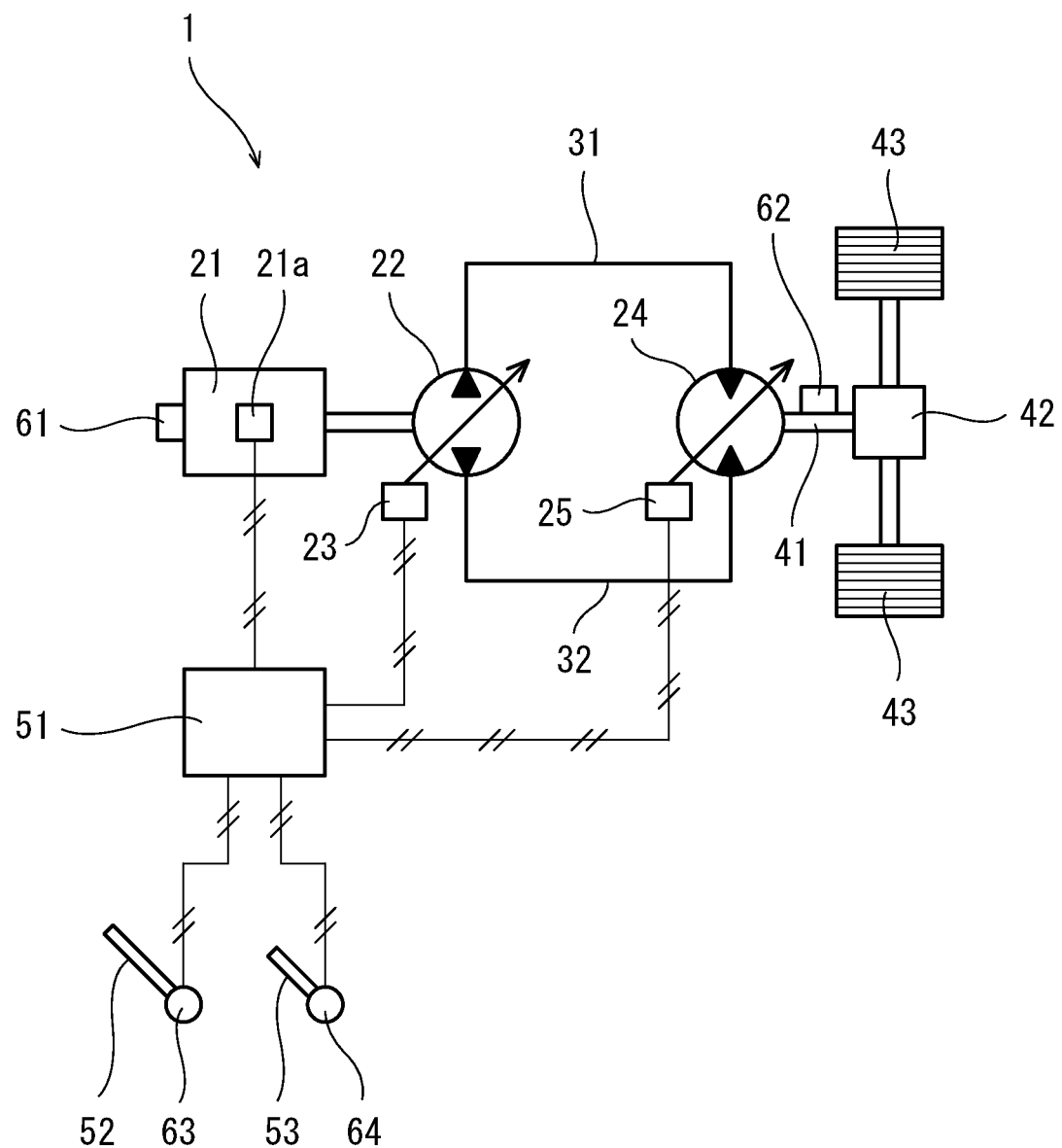
FIG. 1 shows a schematic configuration of a HST system according to one embodiment of the present invention.

FIG. 1 shows a HST system 1 according to one embodiment of the present invention. The HST system 1 is a system for use in traveling of a vehicle. The vehicle in which the HST system 1 is installed is not particularly limited, but may be, for example, a construction machine such as a wheel loader, a wheel excavator, or a bulldozer, or may be an automobile.

In the present embodiment, the traveling means of the vehicle are wheels 43. Alternatively, the traveling means of the vehicle may be, for example, crawlers.

Specifically, the HST system 1 includes: an engine 21; a variable displacement pump 22 driven by the engine 21; and a variable displacement motor 24, which drives the wheels 43. The motor 24 is connected to the pump 22 by a pair of supply/discharge lines 31 and 32, such that a closed loop is formed.

The engine 21 is an internal combustion engine. The engine 21 is provided with fuel injection valves 21a (FIG. 1 shows only one fuel injection valve 21a as a representative example). The fuel injection valves 21a are controlled by a below-described controller 51. For example, the fuel injection valves 21a are controlled such that, in low and medium speed regions in which the vehicle speed is lower than V2 indicated in FIG. 4, the number of rotations of the engine 21 is kept constant, whereas in a high speed region in which the vehicle speed is higher than V2, the number of rotations of the engine 21 increases in proportion to the vehicle speed.

The pump 22 is an over-center pump. When the vehicle travels forward, the pump 22 supplies hydraulic oil to the motor 24 through one of the supply/discharge lines 31 and 32, and when the vehicle travels backward, the pump 22 supplies the hydraulic oil to the motor 24 through the other one of the supply/discharge lines 31 and 32.

The motor 24 is coupled to the wheels 43 via a drive shaft 41 and an axle 42. Although not illustrated, an unshown axle shaft is provided with a mechanical brake. The mechanical brake presses a slide member, such as a pad or lining, against a disc or drum that rotates together with the axle shaft, thereby applying braking force to the axle shaft. The mechanical brake is directly connected to a brake device including a below-described brake pedal 53. The mechanical brake acts in accordance with a depression amount of the brake pedal 53.

The pump 22 may be a swash plate pump or a bent axis pump. Similarly, the motor 24 may be a swash plate motor or a bent axis motor.

The displacement of the pump 22 is changed by a pump regulator 23, and the displacement of the motor 24 is changed by a motor regulator 25. Each of the pump regulator 23 and the motor regulator 25 moves in accordance with an electrical signal.

For example, in a case where the pump 22 is a swash plate pump, the pump regulator 23 may electrically change the hydraulic pressure applied to a servo piston coupled to the swash plate of the pump 22, or may be an electric actuator coupled to the swash plate of the pump 22. Similarly, in a case where the motor 24 is a swash plate motor, the motor regulator 25 may electrically change the hydraulic pressure applied to a servo piston coupled to the swash plate of the motor 24, or may be an electric actuator coupled to the swash plate of the motor 24.

The aforementioned controller 51 controls not only the fuel injection valves 21a, but also the pump regulator 23 and the motor regulator 25. For example, the controller 51 is a computer including memories such as a ROM and RAM, a storage such as a HDD, and a CPU. The CPU executes a program stored in the ROM or HDD.

An accelerator pedal 52 and the aforementioned brake pedal 53 are provided in an operator cab that is not shown.

The accelerator pedal 52 receives an accelerator operation that is an operation to increase the vehicle speed, and the brake pedal 53 receives a brake operation that is an operation to decrease the vehicle speed.

A depression amount of the accelerator pedal 52 is detected by a first depression amount detector 63, and a depression amount of the brake pedal 53 is detected by a second depression amount detector 64. The first depression amount detector 63 and the second depression amount detector 64 are, for example, potentiometers.

The controller 51 is electrically connected to the first depression amount detector 63 and the second depression amount detector 64. The controller 51 is also electrically connected to a rotation number detector 61 and a vehicle speed detector 62. The rotation number detector 61 detects the number of rotations of the engine 21 per unit time (i.e., the rotation speed of the engine 21). The vehicle speed detector 62 detects the vehicle speed. FIG. 1 shows only part of signal lines for the purpose of simplifying the drawing. In the present embodiment, the vehicle speed detector 62 converts the number of rotations of the drive shaft 41 per unit time (in units of rpm) into the vehicle speed (in units of km/h).

Next, control performed by the controller 51 is described with reference to FIG. 2.

First, the controller 51 determines whether or not a depression amount $\theta$ of the accelerator pedal 52 detected by the first depression amount detector 63 is zero (step S1). In a case where the controller 51 determines that the depression amount $\theta$ of the accelerator pedal 52 is not zero (NO in step S1), the flow proceeds to step S6, in which the controller 51 controls the fuel injection valves 21a to inject the fuel corresponding to the depression amount $\theta$ of the accelerator pedal 52 into the engine 21.

Figure 4:
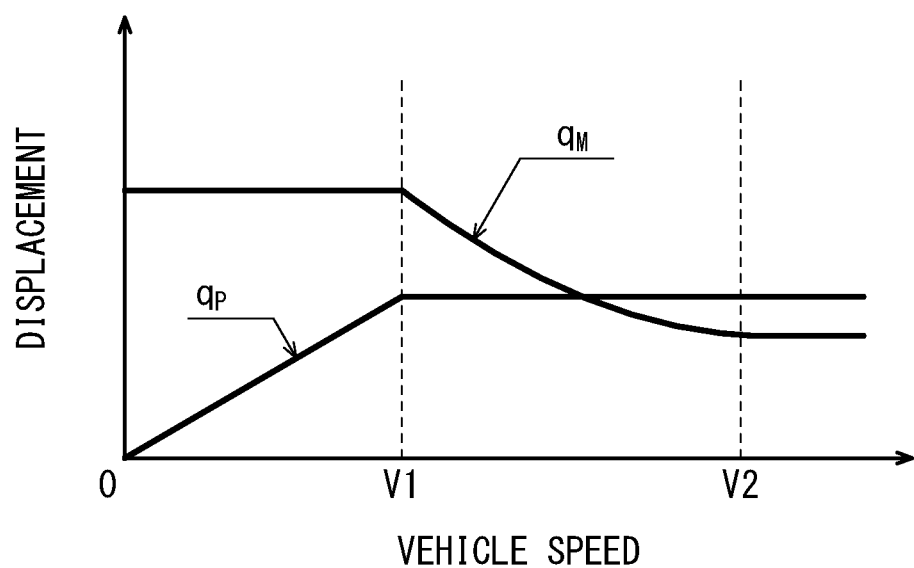
FIG. 4 is a graph showing a relationship between the vehicle speed and the pump displacement as well as a relationship between the vehicle speed and the motor displacement.

Although not illustrated, after step S6, the controller 51 controls the pump regulator 23 and the motor regulator 25, such that the displacement $q_p$ of the pump 22 and the displacement $q_M$ of the motor 24 change in accordance with the vehicle speed V detected by the vehicle speed detector 62 as illustrated in a graph shown in FIG. 4.

On the other hand, in a case where the controller 51 determines that the depression amount $\theta$ of the accelerator pedal 52 is zero (YES in step S1), the flow proceeds to step S2, in which the controller 51 determines whether or not a particular downhill travel condition is satisfied based on the result of the detection by the vehicle speed detector 62 and the result of the detection by the rotation number detector 61. In the present embodiment, the particular downhill travel condition includes three individual conditions. That is, the particular downhill travel condition being satisfied means the three individual conditions holding true at the same time.

The first individual condition is that the vehicle speed V detected by the vehicle speed detector 62 is higher than a setting value Vs. The second individual condition is that a derivative value of the vehicle speed V (dV/dt) is greater than zero (i.e., the vehicle is increasing its speed). The third individual condition is that the number of rotations Ne of the engine 21 detected by the rotation number detector 61 is greater than a setting value Ns.

For example, the setting value Vs compared with the vehicle speed V is a value greater than V2 in FIG. 4, which is the boundary between the high speed region and the medium speed region. The setting value Ns compared with the number of rotations Ne of the engine 21 is a value greater than the aforementioned number of rotations that is kept constant in the low and medium speed regions.

In a case where the controller 51 determines that the particular downhill travel condition is satisfied (YES in step S2), the flow proceeds to step S3. On the other hand, in a case where the controller 51 determines that the particular downhill travel condition is not satisfied (NO in step S2), the flow proceeds to step S6. In the case where the flow proceeds from step S2 to step S6, since the depression amount θ of the accelerator pedal 52 is zero, the controller 51 controls the fuel injection valves 21a to inject the fuel in such an amount that the number of engine rotations can be maintained as the number of engine rotations for idling.

In step S3, the controller 51 controls the fuel injection valves 21a to stop fuel injection into the engine 21. Then, after the fuel injection is stopped, the controller 51 determines whether or not the particular downhill travel condition is still satisfied (step S4).

In a case where the controller 51 determines that the particular downhill travel condition is still satisfied after the fuel injection is stopped (YES in step S4), the flow proceeds to step S5. On the other hand, in a case where the controller 51 determines that the particular downhill travel condition is not satisfied after the fuel injection is stopped (NO in step S4), the flow returns to step S1, in which the controller 51 determines again whether or not the depression amount θ of the accelerator pedal 52 is zero.

In step S5, the controller 51 controls the motor regulator 25 to increase the displacement $q_M$ of the motor 24 by a predetermined amount, and controls the pump regulator 23 to decrease the displacement $q_p$ of the pump 22 by a predetermined amount. Thereafter, the flow returns to step S4, and the controller 51 repeats step S5 until the particular downhill travel condition is no longer satisfied. Accordingly, in a case where the particular downhill travel condition is satisfied, the displacement $q_M$ of the motor 24 increases gradually, and also, the displacement $q_p$ of the pump 22 decreases gradually.

Figure 3A:
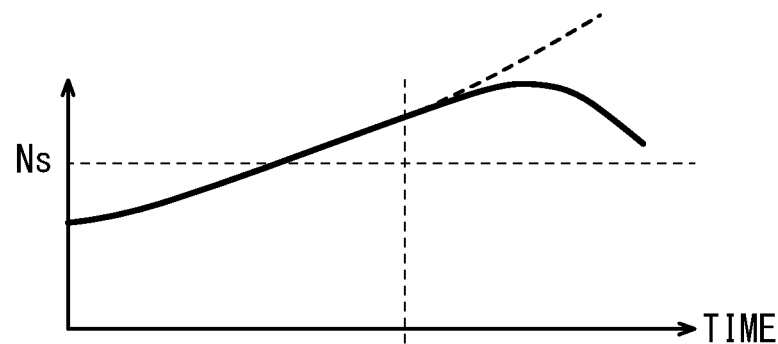
FIG. 3A to FIG. 3D are graphs showing temporal changes in the number of engine rotations, a pump displacement, a motor displacement, and a vehicle speed in a high speed region.
Figure 3B:
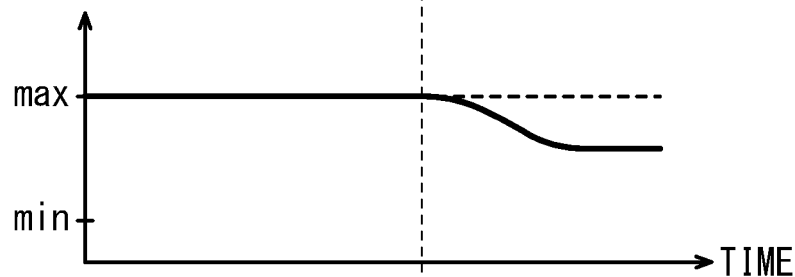
Figure 3C:
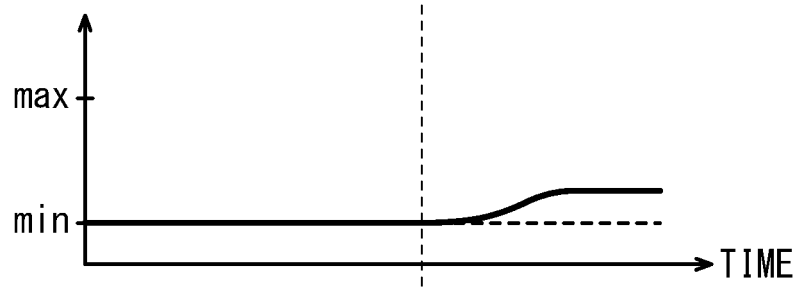
Figure 3D:
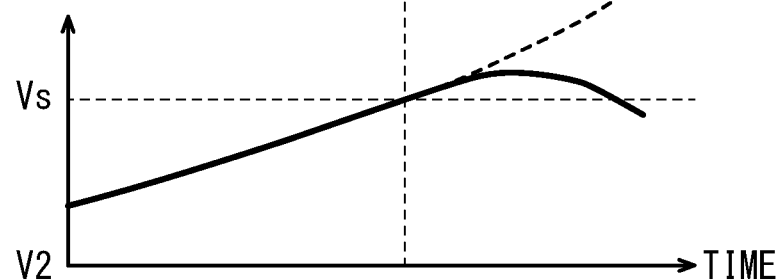

For example, FIG. 3A to FIG. 3D show temporal changes in the number of rotations Ne of the engine 21, the displacement $q_p$ of the pump 22, the displacement $q_M$ of the motor 24, and the vehicle speed V in a case where: the vehicle speed V is in the high speed region; the vehicle is traveling on a downward slope, and the accelerator pedal 52 is not depressed. As shown in FIG. 3A to FIG. 3D, as a result of the above-described control, when the vehicle speed V exceeds the setting value Vs, the engine brake is applied, and thereafter, increase in the number of rotations Ne of the engine 21 and increase in the vehicle speed V are suppressed. Also, as shown in FIG. 3B to FIG. 3D, at a point when increase in the vehicle speed V stops (NO in step S4), increase in the displacement $q_M$ of the motor 24 and decrease in the displacement $q_p$ of the pump 22 are stopped.

As described above, in the HST system 1 of the present embodiment, in a case where the depression amount θ of the accelerator pedal 52 is zero and the particular downhill travel condition is satisfied, the displacement $q_M$ of the motor 24 is increased, and thereby the speed reduction ratio is increased. This makes it possible to automatically use the engine brake regardless of whether or not the brake pedal 53 is depressed. That is, in the present embodiment, the engine brake is applied for as long a time as possible. As a result, wear of the slide member of the mechanical brake is reduced.

In particular, in the present embodiment, the controller 51 decreases the displacement $q_p$ of the pump 22 when increasing the displacement $q_M$ of the motor 24. Therefore, in this case, the speed reduction ratio at the time of using the engine brake is higher than in a case where the displacement $q_p$ of the pump 22 is kept constant. This makes it possible to increase the braking force of the engine brake.

(Variations)

The present invention is not limited to the above-described embodiment. Various modifications can be made without departing from the scope of the invention.

Figure 2:
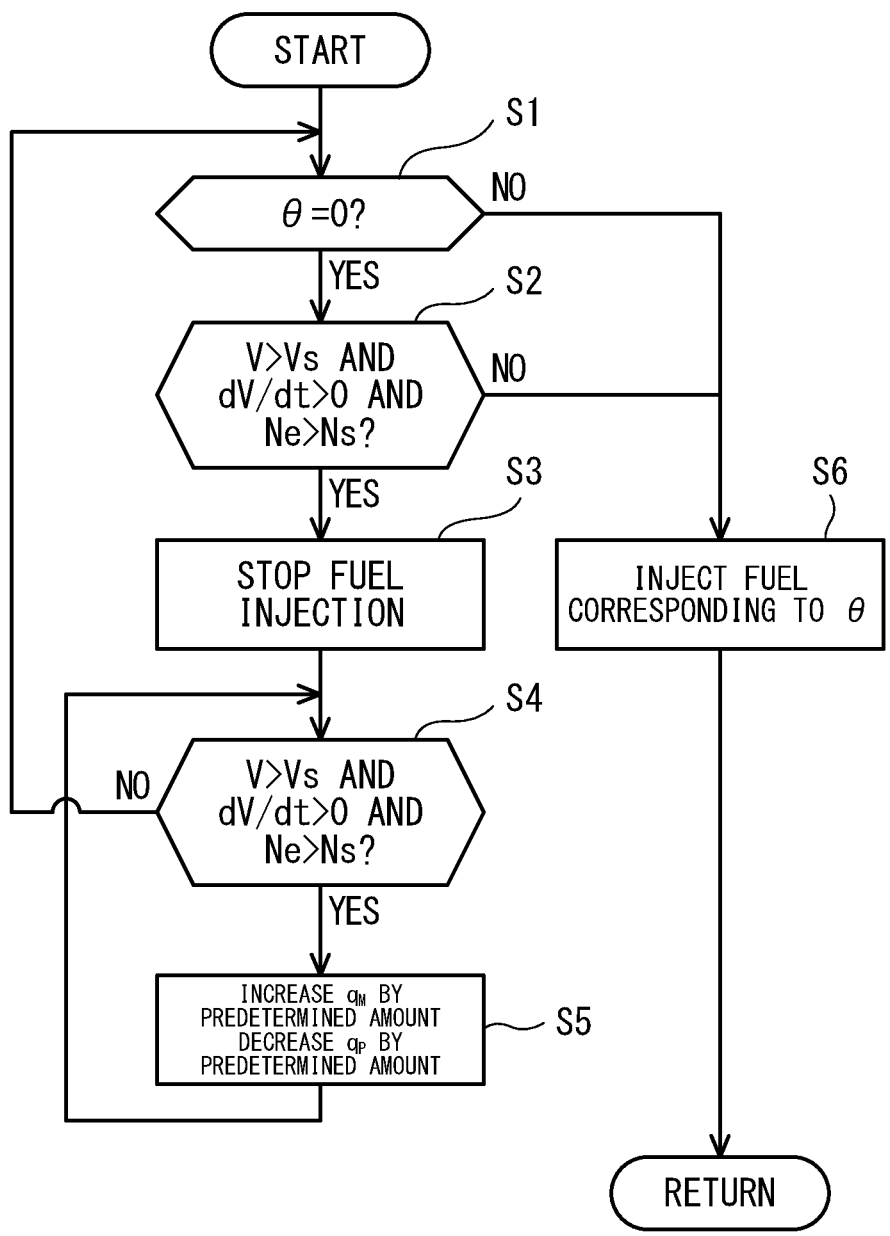
FIG. 2 is a flowchart of control performed by a controller.

For example, in step S5 of FIG. 2, the controller 51 may increase the displacement $q_M$ of the motor 24 without decreasing the displacement $q_p$ of the pump 22.

SUMMARY

A HST system according to the present invention is a HST system for use in traveling of a vehicle. The HST system includes: a variable displacement motor that drives traveling means; a motor regulator that changes a displacement of the motor; a variable displacement pump connected to the motor such that a closed loop is formed, the variable displacement pump being driven by an engine; a pump regulator that changes a displacement of the pump; a depression amount detector that detects a depression amount of an accelerator pedal; a vehicle speed detector that detects a vehicle speed of the vehicle; a rotation number detector that detects a number of rotations of the engine per unit time; and a controller that controls the motor regulator and the pump regulator. The controller: determines whether or not a particular downhill travel condition is satisfied based on a result of detection by the vehicle speed detector and a result of detection by the rotation number detector; and in a case where the depression amount of the accelerator pedal, which is detected by the depression amount detector, is zero and the particular downhill travel condition is satisfied, controls the motor regulator to increase the displacement of the motor.

According to the above configuration, in a case where the depression amount of the accelerator pedal is zero and the particular downhill travel condition is satisfied, the displacement of the motor is increased, and thereby the speed reduction ratio is increased. This makes it possible to automatically use the engine brake regardless of whether or not the brake pedal is depressed.

For example, the particular downhill travel condition may include: a condition that the vehicle speed detected by the vehicle speed detector is higher than a setting value; a condition that a derivative value of the vehicle speed is greater than zero; and a condition that the number of rotations of the engine, which is detected by the rotation number detector, is greater than a setting value.

The controller may control a fuel injection valve of the engine. The controller may: in a case where the depression amount of the accelerator pedal, which is detected by the depression amount detector, is zero and the particular downhill travel condition is satisfied, control the fuel injection valve to stop fuel injection into the engine; and in a case where the particular downhill travel condition is still satisfied after the fuel injection into the engine is stopped, control the motor regulator to increase the displacement of the motor.

The controller may control the pump regulator to decrease the displacement of the pump when controlling the motor regulator to increase the displacement of the motor. According to this configuration, the speed reduction ratio at the time of using the engine brake is higher than in a case where the displacement of the pump is kept constant. This makes it possible to increase the braking force of the engine brake.

The invention claimed is:

1. A hydraulic static transmission system for use in traveling of a vehicle, the hydraulic static transmission system comprising:
    a variable displacement motor that drives traveling means;
    a motor regulator that changes a displacement of the motor;
    a variable displacement pump connected to the motor such that a closed loop is formed, the variable displacement pump being driven by an engine;
    a pump regulator that changes a displacement of the pump;
    a depression amount detector that detects a depression amount of an accelerator pedal;
    a vehicle speed detector that detects a vehicle speed of the vehicle;
    a rotation number detector that detects a number of rotations of the engine per unit time; and
    a controller that controls the motor regulator and the pump regulator, wherein
    the controller:
        determines whether or not a particular downhill travel condition is satisfied based on a result of detection by the vehicle speed detector and a result of detection by the rotation number detector; and
        in a case where the depression amount of the accelerator pedal, which is detected by the depression amount detector, is zero and the particular downhill travel condition is satisfied, controls the motor regulator to increase the displacement of the motor
    wherein
    the particular downhill travel condition includes:
        a condition that the vehicle speed detected by the vehicle speed detector is higher than a setting value;
        a condition that a derivative value of the vehicle speed is greater than zero; and
        a condition that the number of rotations of the engine, which is detected by the rotation number detector, is greater than a setting value.

2. The hydraulic static transmission system according to claim 1, wherein
    the controller controls the pump regulator to decrease the displacement of the pump when controlling the motor regulator to increase the displacement of the motor.

3. A hydraulic static transmission system for use in traveling of a vehicle, the hydraulic static transmission system comprising:
    a variable displacement motor that drives traveling means;
    a motor regulator that changes a displacement of the motor;
    a variable displacement pump connected to the motor such that a closed loop is formed, the variable displacement pump being driven by an engine;
    a pump regulator that changes a displacement of the pump;
    a depression amount detector that detects a depression amount of an accelerator pedal;
    a vehicle speed detector that detects a vehicle speed of the vehicle;
    a rotation number detector that detects a number of rotations of the engine per unit time; and
    a controller that controls the motor regulator, the pump regulator and a fuel injection valve of the engine, wherein
    the controller:
        determines whether or not a particular downhill travel condition is satisfied based on a result of detection by the vehicle speed detector and a result of detection by the rotation number detector;
        in a case where the depression amount of the accelerator pedal, which is detected by the depression amount detector, is zero and the particular downhill travel condition is satisfied, controls the fuel injection valve to stop fuel injection into the engine; and
        in a case where the particular downhill travel condition is still satisfied after the fuel injection into the engine is stopped, controls the motor regulator to increase the displacement of the motor.

* * * * *